(12) United States Patent (10) Patent No.: US 12,583,438 B2

Hashimoto et al. (45) Date of Patent: Mar. 24, 2026

(54) VEHICLE CONTROL DEVICE TO CONTROL VEHICLE POWER SOURCE BASED ON ELECTRIC POWER PRICE, GASOLINE PRICE AND TOTAL CARBON DIOXIDE EMISSIONS DISCHARGED

(71) Applicant: TOYOTA JIDOSHA KABUSHIKI KAISHA, Toyota (JP)

(72) Inventors: Toshiya Hashimoto, Miyoshi (JP); Masato Maemura, Nisshin (JP); Ryosuke Ikemura, Susono (JP); Shogo Tsuge, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 18/633,786

(22) Filed: Apr. 12, 2024

(65) Prior Publication Data

US 2024/0409082 A1 Dec. 12, 2024

(30) Foreign Application Priority Data

Jun. 7, 2023 (JP) ................................. 2023-094167

(51) Int. Cl.
B60W 20/40 (2016.01)
B60W 10/06 (2006.01)
B60W 10/08 (2006.01)
B60W 20/16 (2016.01)

(52) U.S. Cl.
CPC ............ B60W 20/40 (2013.01); B60W 10/06 (2013.01); B60W 10/08 (2013.01); B60W 20/16 (2016.01); B60W 2510/242 (2013.01)

(58) Field of Classification Search
CPC ...... B60W 20/40; B60W 10/06; B60W 10/08; B60W 20/16; B60W 2510/242; B60W 20/12; B60W 20/00; B60W 20/15
See application file for complete search history.

(56) References Cited

U.S. PATENT DOCUMENTS

2010/0138093 A1    6/2010  Oku et al.
2011/0160990 A1*   6/2011  Mineta ............... G01C 21/3469
                                                           701/123
2023/0322091 A1*  10/2023  Yokoyama .............. H02J 50/12

FOREIGN PATENT DOCUMENTS

EP          2689982 B1 *  11/2017  ......... G01C 21/3469
JP      2008-265666 A      11/2008
JP      2008-308030 A      12/2008
JP      2014-058289 A       4/2014
JP      2017-136943 A       8/2017

* cited by examiner

*Primary Examiner* — Brian P Sweeney
(74) *Attorney, Agent, or Firm* — OLIFF PLC

(57) ABSTRACT

A vehicle control device includes a rotating electrical machine and a gasoline engine, and controls a vehicle that receives electric power from a power supply lane provided on a road side and charges a battery that outputs power of the rotating electrical machine, the vehicle control device including a processor, wherein the processor selects one of first travel by the rotating electrical machine and second travel by the gasoline engine based on the electric power price and the gasoline price, and a total $CO_2$ emissions discharged until the destination, and controls the travel of the vehicle on a route to the destination.

5 Claims, 5 Drawing Sheets

FIG. 3

VEHICLE CONTROL DEVICE TO CONTROL VEHICLE POWER SOURCE BASED ON ELECTRIC POWER PRICE, GASOLINE PRICE AND TOTAL CARBON DIOXIDE EMISSIONS DISCHARGED

CROSS-REFERENCE TO RELATED APPLICATION

This application claims priority to Japanese Patent Application No. 2023-094167 filed on Jun. 7, 2023, incorporated herein by reference in its entirety.

BACKGROUND

1. Technical Field

The present disclosure relates to vehicle control devices.

2. Description of Related Art

Japanese Unexamined Patent Application Publication No. 2008-308030 (JP 2008-308030 A) discloses a hybrid electric vehicle that includes an externally chargeable main battery and an engine and that controls the amount of charge from the outside to the main battery based on received electric power price information and fuel price information and a vehicle travel history.

SUMMARY

In recent years, efforts have been made in various areas to reduce the load on the environment, and it is also desired to reduce the environmental load of travel of vehicles.

The present disclosure was made in view of the above circumstances, and it is an object of the present disclosure to provide a vehicle control device that can achieve both economical travel and reduction in environmental load.

A vehicle control device according to the present disclosure is a vehicle control device that controls a vehicle, the vehicle including a rotating electrical machine and a gasoline engine and configured to charge a battery that receives electric power from a power supply lane provided on a road and that outputs power of the rotating electrical machine. The vehicle control device includes a processor. The processor is configured to control travel of the vehicle along a route to a destination by selecting, based on an electric power price, a gasoline price, and total $CO_2$ emissions discharged until the destination, either first travel using the rotating electrical machine and second travel using the gasoline engine.

According to the present disclosure, it is possible to achieve both economical travel and reduction in environmental load.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating a schematic configuration of a vehicle to which a control device for a vehicle according to an embodiment is applied;

DETAILED DESCRIPTION OF EMBODIMENTS

A vehicle control device according to an embodiment of the present disclosure will be described with reference to the drawings. Incidentally, the constituent elements in the following embodiments include those that can be easily replaced by a person skilled in the art or those that are substantially the same.

EMBODIMENT

Figure 3:
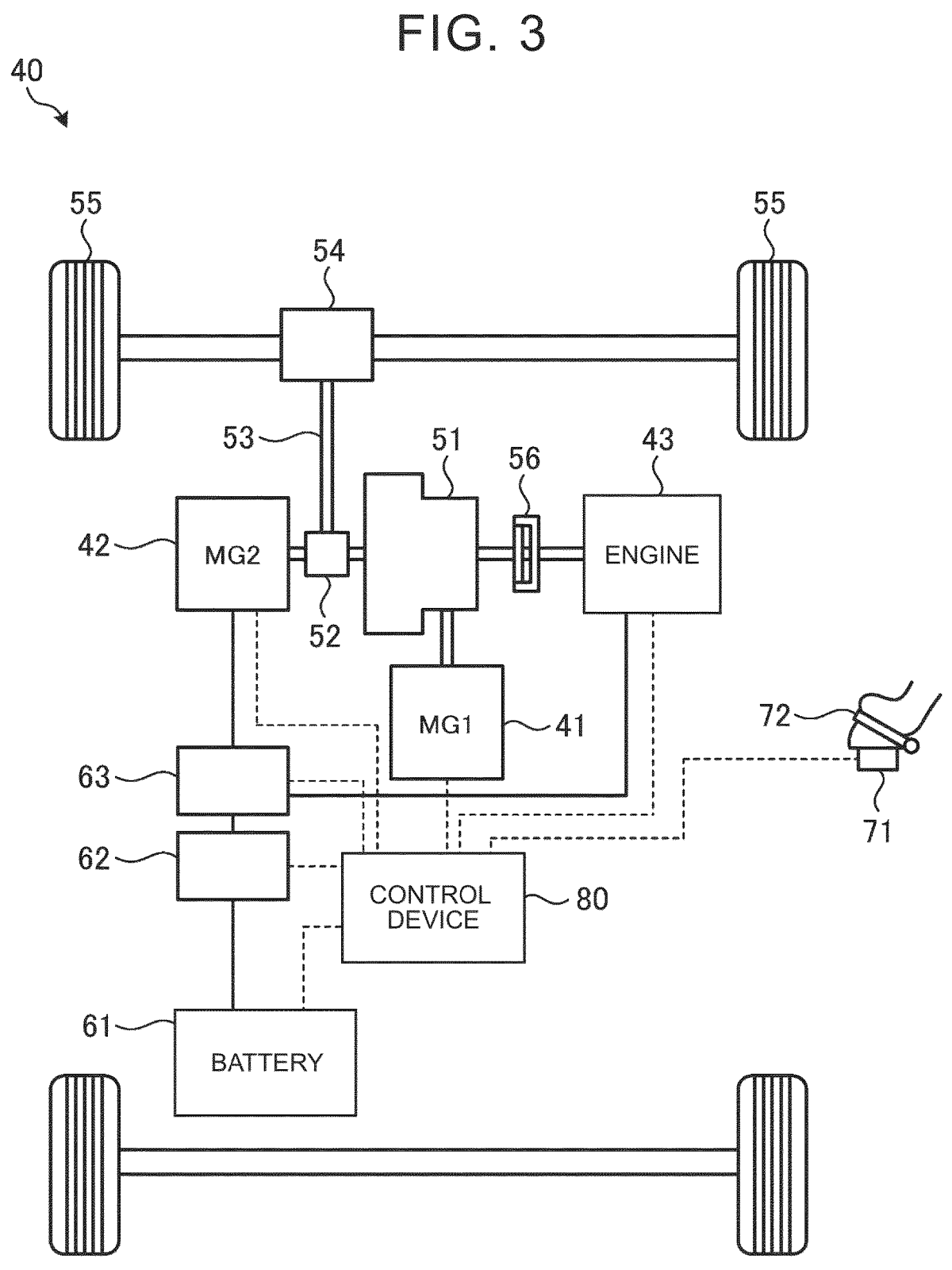

A Wireless Power Transfer System in which the vehicle control device according to the embodiment is applied will be described referring to FIGS. 1 to 3.

Figures 1, 2:
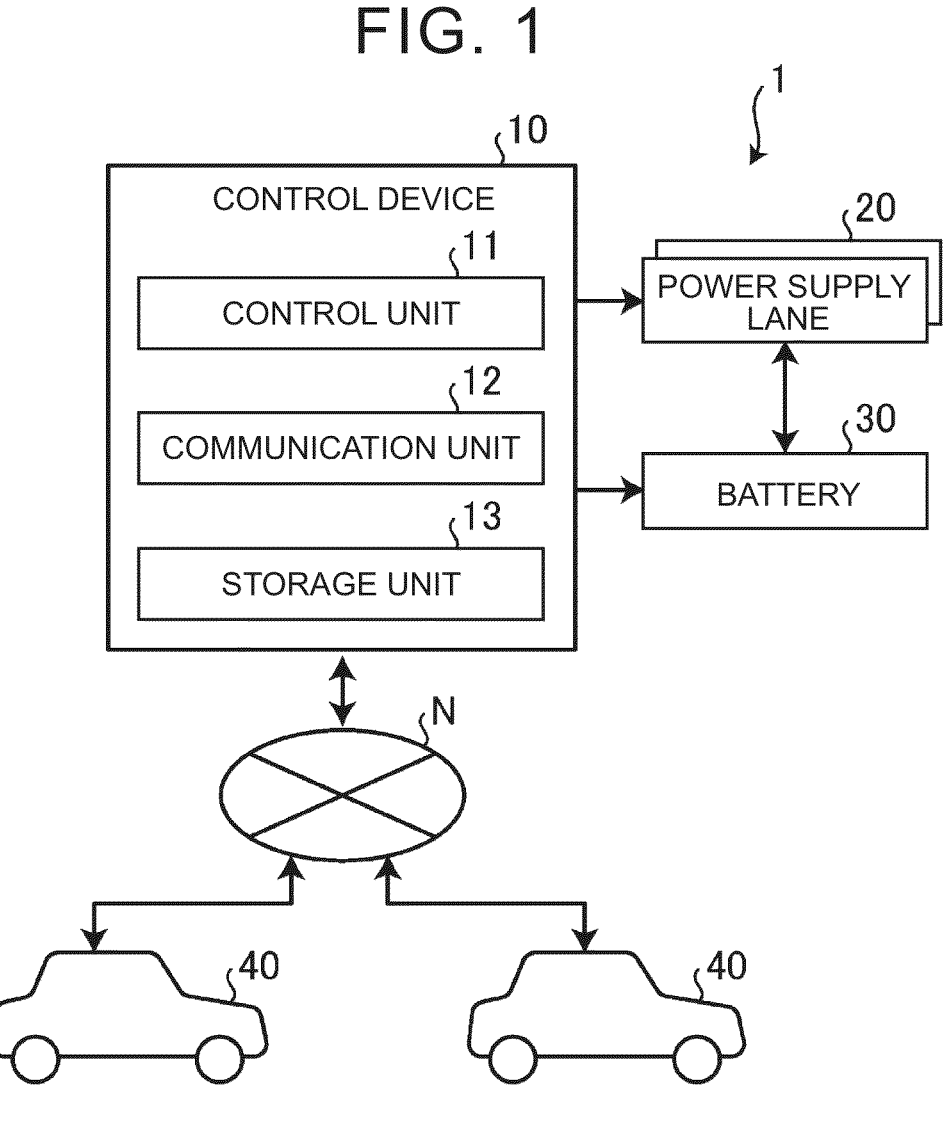
FIG. 1 is a schematic diagram illustrating a wireless power transfer system including a vehicle control device according to an embodiment.
FIG. 2 is a diagram for explaining a power supply lane.

FIG. 1 is a schematic diagram illustrating a wireless power transfer system including a vehicle control device according to an embodiment. The wireless power transfer system 1 performs wireless power transmission from the power supply lane 20 to the vehicle 40 by, for example, magnetic field resonance coupling (magnetic field resonance). The wireless power transfer system 1 includes a control device 10, a power supply lane 20, a battery 30, and a vehicle 40. The vehicle 40 is, for example, a hybrid electric vehicle including a rotating electrical machine and an engine. The vehicle 40 may be a manual driving vehicle or an automatic driving vehicle. In addition, the vehicles 40 include a communication unit (for example, a Data Communication Module (DCM)) for communicating with the control device 10.

The wireless power transfer system 1 performs wireless power transmission from the power supply lane 20 to the vehicle 40 by magnetic field resonance coupling (magnetic field resonance).

The wireless power transfer system 1 transmits power to a vehicle 40 traveling on a power supply lane 20 disposed on a road in a non-contact manner. That is, the wireless power transfer system 1 transmits power by a magnetic field resonance method, and realizes power supply during travel to the vehicle 40 by using magnetic field resonance coupling (magnetic field resonance). The wireless power transfer system 1 can be represented as a dynamic wireless power transfer (D-WPT) system or a magnetic field dynamic wireless power transfer (MF-D-WPT) system.

The control device 10 and the vehicle 40 each have a communication function and are configured to be able to communicate with each other through the network N. The network N includes, for example, an Internet network, a mobile telephone network, a WiFi (registered trademark, Wireless Fidelity), a BLE (Bluetooth (registered trademark) Low Energy), and the like.

The control device 10 exchanges various kinds of information with the vehicle 40 and controls the power supply lane 20 and the battery 30. The control device 10 includes a control unit 11, a communication unit 12, and a storage unit 13.

Specifically, the control unit 11 includes a processor including Central Processing Unit (CPU), Digital Signal Processor (DSP), Field-Programmable Gate Array (FPGA), Graphics Processing Unit (GPU), and the like, and a memory (main storage unit) including Random Access Memory (RAM), Read Only Memory (ROM), and the like.

The control unit 11 loads a program stored in the storage unit 13 into a work area of the main storage unit and executes the program, and controls each component and the like through execution of the program, thereby realizing a function that matches a predetermined purpose.

The communication unit 12 includes, for example, a communication module capable of transmitting and receiving various types of information. The communication unit 12 communicates with the vehicle 40 through, for example, the network N to transmit and receive various types of information when power is supplied from the power supply lane 20 to the vehicle 40 or when the power supply lane 20 is supplied with power from the vehicle 40.

The storage unit 13 includes, for example, Erasable Programmable ROM (EPROM), Hard Disk Drive (HDD), and a recording medium such as a removable medium. Examples of the removable medium include disc recording media such as Universal Serial Bus (USB) memories, Compact Disc (CD), Digital Versatile Disc (DVD), Blu-ray (registered trademark) Disc (BD). The storage unit 13 can store Operating System (OS), various programs, various tables, various databases, and the like.

The storage unit 13 stores, for example, various types of information exchanged with the vehicle 40, information on the remaining capacity of the battery 30, and the like.

FIG. 2 is a diagram for explaining a power supply lane. In the present embodiment, as shown in FIG. 2, the shape of the vehicle and the like may be different as long as they have a common function.

The power supply lane 20 is configured to be able to supply electric power to the vehicle 40 in a non-contact manner. Specifically, the power supply lane 20 includes an energization unit 21 including a coil that supplies or receives power to or from the vehicle 40. The energization unit 21 is embedded in a lane of a road.

The battery 30 is a stationary power storage device. When the power supply lane 20 functions as a power transmission lane, the battery 30 supplies power to the power supply lane 20. When the power supply lane 20 functions as a power reception lane, the battery 30 receives electric power from the power supply lane 20 and stores the electric power. Further, the battery 30 may be supplied with electric power from an external power generation facility, or may be supplied with electric power to an external consumer facility. Although only one battery 30 is illustrated in FIG. 1, the battery 30 may be provided for each power supply lane 20.

Figure 4:
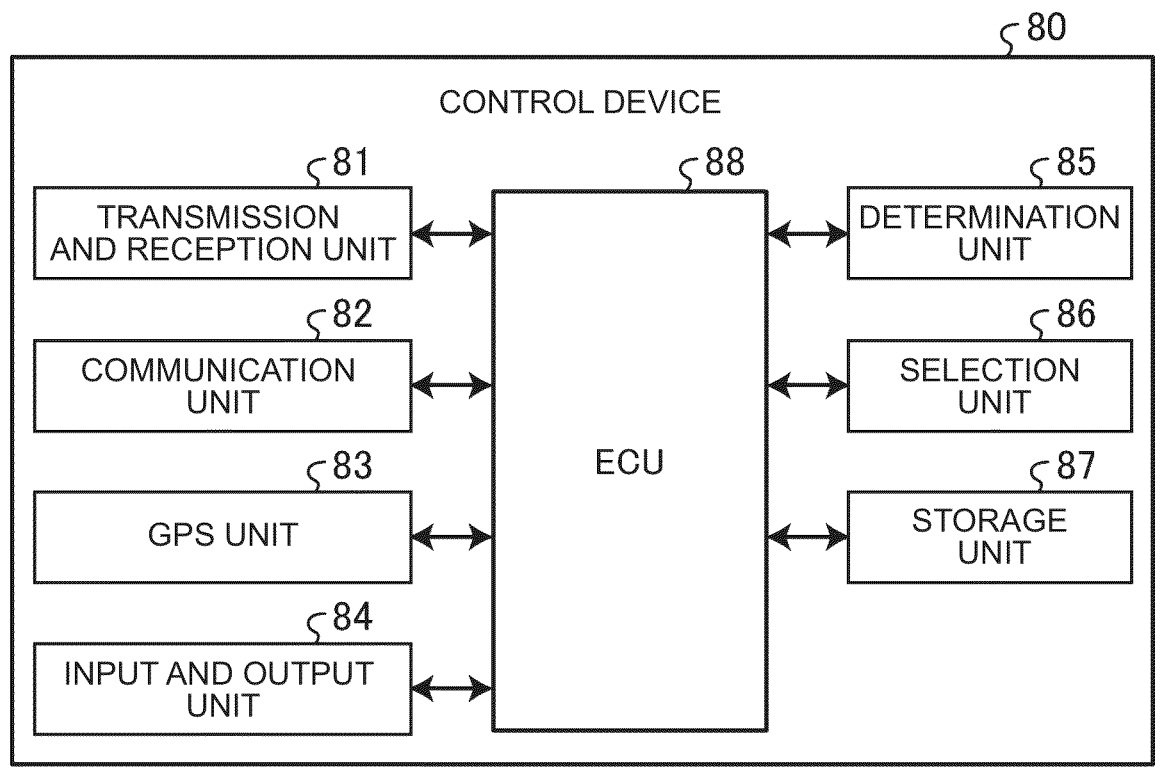
FIG. 4 is a block diagram for explaining a functional configuration of a vehicle in which the vehicle control device according to the embodiment is provided.

Next, the configuration of the vehicle 40 will be described with reference to FIGS. 1, 3, and 4. FIG. 3 is a diagram illustrating a schematic configuration of a vehicle to which a control device for a vehicle according to an embodiment is applied. FIG. 4 is a block diagram for explaining a functional configuration of a vehicle in which the vehicle control device according to the embodiment is provided. In the vehicle 40, the battery 61 is charged by electric power supplied from the energization unit 21 managed by the control device 10.

Vehicle 40 is a hybrid electric vehicle including a first rotating electrical machine 41 (MG1), a second rotating electrical machine 42 (MG2), and an engine 43. Although the vehicle 40 shown in FIG. 1 includes two rotating electrical machines, the present disclosure is not limited to this, and may be configured to include, for example, one rotating electrical machine capable of outputting a driving force for traveling the vehicle and the engine 43. In other words, the vehicle 40 according to the embodiment only needs to be configured to be able to travel with at least only the driving force (torque) from the rotating electrical machine or only the driving force (torque) from the engine 43.

Each of the first rotating electrical machine 41 and the second rotating electrical machine 42 includes a stator including a three-phase winding (coil) for generating a rotating magnetic field, and a rotor including a permanent magnet for generating a torque by a magnetic force between the stator and the rotating magnetic field. Each of the first rotating electrical machine 41 and the second rotating electrical machine 42 is a so-called motor generator that operates as an electric motor and can also operate as a generator.

The first rotating electrical machine 41 is mainly used as a generator. The first rotating electrical machine 41 further cranks the engine 43 when the engine 43 is started. Note that the first rotating electrical machine 41 generating "torque acting on the engine 43" and performing cranking (rotating the crankshaft of the engine 43) is also referred to as "motoring".

The second rotating electrical machine 42 is mainly used as an electric motor, and can generate a driving force (torque for driving the vehicle 40) of the vehicle 40.

The engine 43 is, for example, an internal combustion engine such as a gasoline engine or a diesel engine. In the present embodiment, an example in which the engine 43 is a gasoline engine will be described. Similarly to the second rotating electrical machine 42, the engine 43 can generate the driving force of the vehicle 40 (torque for driving the vehicle 40).

The vehicle 40 includes a power split mechanism 51. The power split mechanism 51 is a planetary gear mechanism. That is, the power split mechanism 51 includes a sun gear (not shown), a ring gear (not shown) arranged concentrically with the sun gear, a plurality of pinion gears (not shown) meshing with the sun gear and also meshing with the ring gear, and a pinion carrier (not shown) holding the plurality of pinion gears in a state of being rotatable and revolvable around the sun gear.

An output shaft of the first rotating electrical machine 41 is connected to the sun gear so as to be able to transmit torque. A crankshaft of the engine 43 is connected to the pinion carrier so as to transmit torque. An output shaft of the second rotating electrical machine 42 is connected to the ring gear via a speed reduction mechanism 52 so as to be capable of transmitting torque. Further, the output shaft of the second rotating electrical machine 42 is connected to the axle 53 via the speed reduction mechanism 52 so as to be able to transmit torque. The axle 53 is connected via a differential gear 54 to be able to transmit torque to the drive wheels 55.

A torsional damper 56 is interposed between the engine 43 and the power split mechanism 51. The torsional damper 56 rotatably couples the shaft on the engine 43 side and the shaft on the power split mechanism 51 side via an elastic body, and absorbs fluctuations in torque generated by the engine 43.

The vehicle 40 further includes a battery 61, a boost converter 62, and an inverter 63 that is a power converter. The battery 61 is a power storage device, and is, for example, a rechargeable battery such as a lithium-ion battery or a nickel metal hydride battery that can be charged and discharged. The DC power output from the battery 61 is voltage-converted (boosted) by the boost converter 62. The voltage-converted DC power is converted into AC power by the switching operation of the switching element in the inverter 63, and is supplied to the first rotating electrical machine 41 and the second rotating electrical machine 42.

On the other hand, when at least one of the first rotating electrical machine 41 and the second rotating electrical machine 42 operates as a generator, the AC power generated by the first rotating electrical machine and the second rotating electrical machine is converted into DC power by the switching operation of the switching element in the inverter 63. Further, the converted DC power is voltage-converted (step-down) by the boost converter 62 and supplied to the battery 61. As a result, the battery 61 is charged. Alternatively, the AC power generated by the first rotating electrical machine 41 is supplied to the second rotating electrical machine 42 via the inverter 63.

The control device 80 controls the first rotating electrical machine 41, the second rotating electrical machine 42, and the engine 43, and performs communication with the control device 10 and control of the travel mode of the vehicle 40. The control device 80 includes a transmission/reception unit 81, a communication unit 82, a Global Positioning System (GPS) unit 83, an input/output unit 84, a calculation unit 45, a determination unit 85, a storage unit 87, and an Electronic Control Unit (ECU) 88. Further, the vehicle 40 is provided with a battery 61 that supplies electric power to each unit. The battery 61 is a power storage device and is configured to be chargeable. The components for controlling the vehicles 40 are configured by using one or a plurality of computers including a CPU, FPGA, ROM, a RAM, and the like.

The transmission/reception unit 81 functions as a reception unit that receives a power supply signal from the energization unit 21. In addition, the transmission/reception unit 81 functions as a transmission unit that transmits a power supply signal to the energization unit 21.

The communication unit 82 performs communication with each external device by wireless communication via the network N. The communication unit 82 receives, from an external device, road traffic information such as regulations and traffic congestion, and information related to a disaster.

GPS unit 83 receives radio waves from GPS satellites and detects the position of the vehicles 40. The detected position is output to the outside as position information of the vehicle 40 or stored in the storage unit.

The input/output unit 84 includes a touch panel display, a speaker, a microphone, and the like. The input/output unit 84 is configured to be capable of outputting information, such as displaying characters, figures, and the like on a screen of a touch panel display, outputting sound from a speaker, and the like, under the control of ECU 88. In addition, the input/output unit 84 is configured to allow a user of the vehicle 40 or the like to operate the touch panel display or to emit sound toward the microphone, thereby inputting predetermined data to ECU 88.

The determination unit 85 determines the presence or absence of the surplus of the renewable energy, determines whether the gasoline price and the electric power price are high or low, and determines the magnitude relation of the total $CO_2$ emissions in the electric vehicle (EV) travel and Hybrid Vehicle (HV) travel.

The selection unit 86 selects one of EV travel by the second rotating electrical machine 42 and HV travel by the engine 43 based on the determination result of the determination unit 85.

The storage unit 87 is configured by using a computer-readable recording medium, and stores various programs and various data in a writable and readable manner. The recording medium includes a storage medium such as a hard disk, a semiconductor memory, an optical disk, a flash memory, and a magnetic disk, and a drive device of the storage medium. The storage unit 87 stores an operating system (OS) and programs of various applications required for ECU 88 to comprehensively control the operations of the respective units of the vehicles 40.

ECU 88 includes an information processing device such as a microcomputer including a CPU, FPGA, ROM, a RAM, and the like. ECU 88 comprehensively controls the electric operations of the respective units of the vehicles 40. ECU 88 is configured to perform an operation using inputted data, data stored in advance, and a program, and output the operation result as a control command signal.

In the vehicle 40, the accelerator operation amount sensor 71 detects an operation amount of the accelerator pedal 72 and outputs a signal representing the operation amount. The control device 80 controls the first rotating electrical machine 41, the second rotating electrical machine 42, the engine 43, and the like in order to drive the vehicle 40 based on the operation amount of the accelerator pedal 72, the vehicle speed, and the like. When autonomous driving of the vehicles 40 is performed, the respective units are driven in accordance with an instruction under the control of ECU 88.

Figure 5:
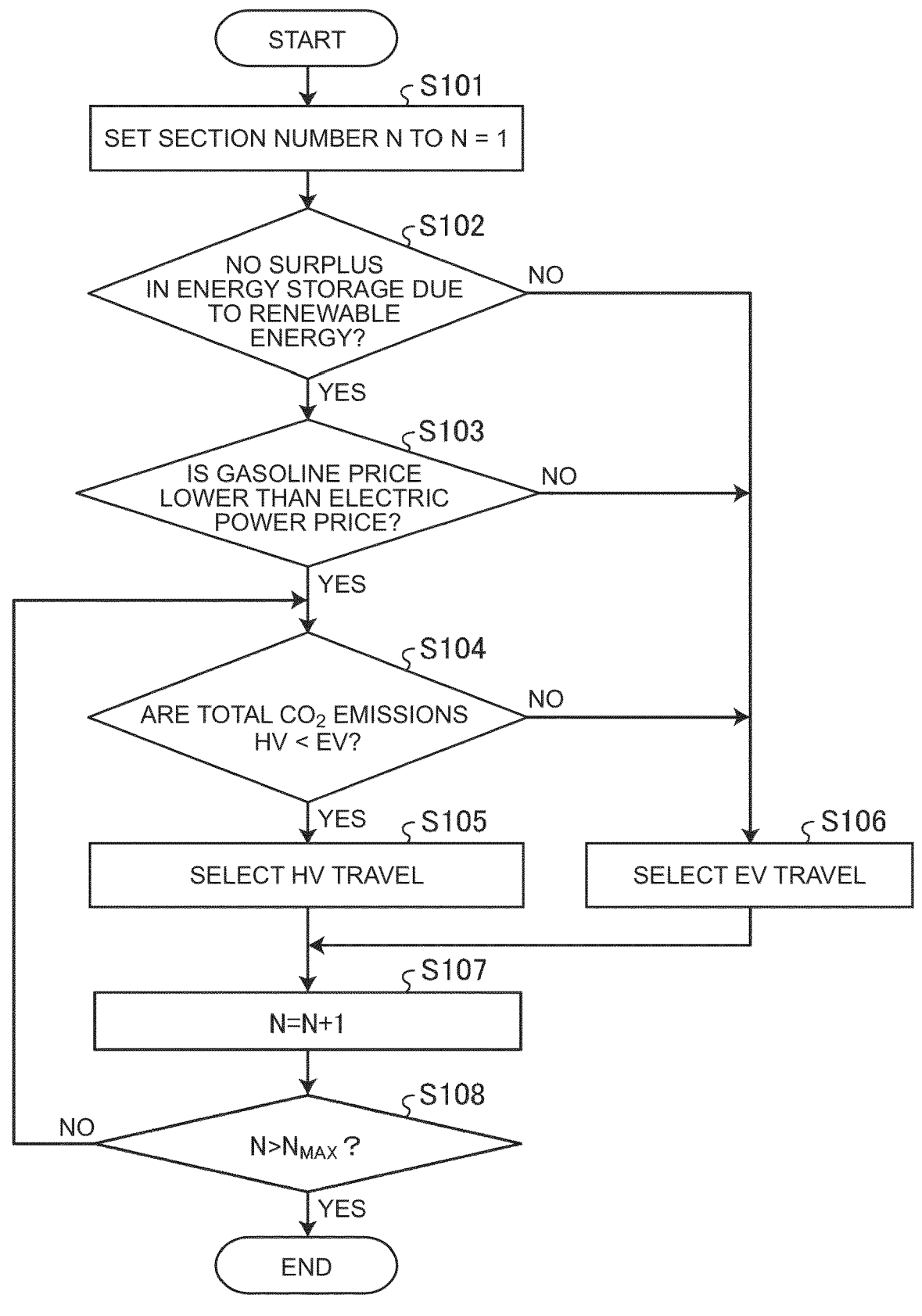
FIG. 5 is a flow chart illustrating a flow of a travel mode setting process according to the embodiment.

Here, in the present embodiment, the travel mode of the vehicle 40 is controlled based on the power state, the price state, and the environmental load. The process of setting the travel mode will be described with reference to FIG. 5. FIG. 5 is a flowchart illustrating a flow of a travel mode setting process according to the embodiment. The setting process of the travel mode is executed, for example, immediately before the vehicle starts traveling.

In the travel control, ECU 88 acquires the power usage status of the renewable energy, the power storage amount, and the gasoline price and the electric power price immediately before the pre-processing or the processing. Renewable energy is energy that exists in nature, such as solar, wind, and some of the earth's resources, such as geothermal. In addition, the gasoline price and the electric power price are prices set under the control of the wireless power transfer system 1.

First, ECU 88 divides the route of the set destination into a plurality of sections according to the type of the road, for example, the inclination angle of the road, the presence or absence of unevenness, and the like, attaches section numbers N (N=1, 2, . . . , $N_{MAX}$), and sets N=1 (S101). If there is no change in the type of the road, $N_{MAX}=1$ may be set.

Then, the determination unit 85 determines whether or not there is a surplus in the amount of electric power stored by the renewable energy under the control of the wireless power transfer system 1 (power supply area by the power supply lane 20) (S102). The determination unit 85 compares the power storage amount with a threshold value set in advance, and determines whether or not there is an excess in the power storage amount based on renewable energy. ECU 88 proceeds to S106 when the determination unit 85 determines that there is a surplus in the amount of electricity stored by renewable energy (S102: No). On the other hand, when the determination unit 85 determines that there is no surplus in the amount of electricity stored by the renewable energy (S102: Yes), ECU 88 proceeds to S103.

In S103, the determination unit 85 compares the gasoline price and the electric power price, and determines whether or not the gasoline price is lower than the electric power price. When the determination unit 85 determines that the gasoline price is equal to or higher than the electric power price (S103: No), ECU 88 proceeds to S106. On the other hand, when the determination unit 85 determines that the gasoline price is lower than the electric power price (S103: Yes), ECU 88 proceeds to S104.

In S104, the determination unit 85 determines, for travel in the set section number N, whether the total $CO_2$ emissions with HV travel when HV travel is performed and the total $CO_2$ emissions when EV travel is performed are compared with each other, and the total $CO_2$ emissions when EV travel is performed is larger than the total $CO_2$ emissions when EV travel is performed. For example, the determination unit 85 determines the magnitude relation between the total $CO_2$ emissions discharged in the case of HV travel and the total $CO_2$ emissions discharged generated in the case of EV travel when traveling on a route from the current location to the destination. At this time, the magnitude relation of the total $CO_2$ emissions of HV travel and EV travel varies depending on the inclination of the roadway, the presence or absence of irregularities, and the like. In addition, even if EV travels at the same rate, the total $CO_2$ emissions change according to the type of renewable energy. For example, in the case of generating electricity by renewable energy or nuclear power, and in the case of generating electricity by using thermal power as renewable energy, the total $CO_2$ emissions are larger in the case of generating electricity by using thermal power. For this reason, the determination unit 85 obtains a power generation method of electric power to be used when power is supplied on the travel route, and calculates the total $CO_2$ emissions by multiplying the power generation method by a factor corresponding to the method, or the like. For example, the coefficient used in this case is larger in thermal power than in renewable energy.

Note that the determination unit 85 may acquire and determine the total $CO_2$ emissions from an external device such as the control device 10.

ECU 88 proceeds to S106 when the determination unit 85 determines that the total $CO_2$ emissions when EV travel is performed is larger than the total $CO_2$ emissions when HV travel is performed (S104: No). ECU 88 proceeds to S105 when the determination unit 85 determines that the total $CO_2$ emissions when EV travel is performed is equal to or less than the total $CO_2$ emissions when HV travel is performed (S104: Yes).

In S105, the selection unit 86 selects the travel mode by HV travel as the travel mode of the vehicle 40 with respect to the travel in the section number N. ECU 88 shifts to S107 after the selection of the travel mode by the selection unit 86.

In addition, in S106, the selection unit 86 selects the travel mode by EV travel as the travel mode of the vehicle 40 with respect to the travel in the section number N. In EV travel mode, for example, the vehicle 40 travels EV while being fed with power while the vehicle is traveling by supplying power from the power supply lane 20. ECU 88 shifts to S107 after the selection of the travel mode by the selection unit 86.

In S107, ECU 88 increments the section number N by 1.

Then, ECU 88 determines whether or not the section number N set in S107 is greater than $N_{MAX}$ (S108). When determining that the section number N is greater than $N_{MAX}$ (S108: Yes), ECU 88 ends the travel mode-setting process. On the other hand, when ECU 88 determines that the section number N is equal to or less than $N_{MAX}$ (S108: No), the process proceeds to S104, and the total $CO_2$ emissions due to the running of the updated section number N is determined.

In this way, a driving mode in which the total $CO_2$ emissions is minimized is set based on the gasoline price and the electric power price. ECU 88 controls the travel of the vehicles 40 according to the selected travel modes for the respective section numbers.

In the present embodiment described above, the travel mode in which $CO_2$ emissions amount is small is selected for each travel section based on the presence or absence of the surplus of the amount of electricity stored by the renewable energy and the comparison between the gasoline price and electric power price, thereby setting the travel mode considering the environmental aspect and the economic aspect. According to the present embodiment, the driving mode is set on the basis of the total $CO_2$ emissions, taking into account the price-superiority of each section obtained by dividing the route to the destination, and therefore, it is possible to achieve both economical driving and reduction in environmental load.

Modification

Figure 6:
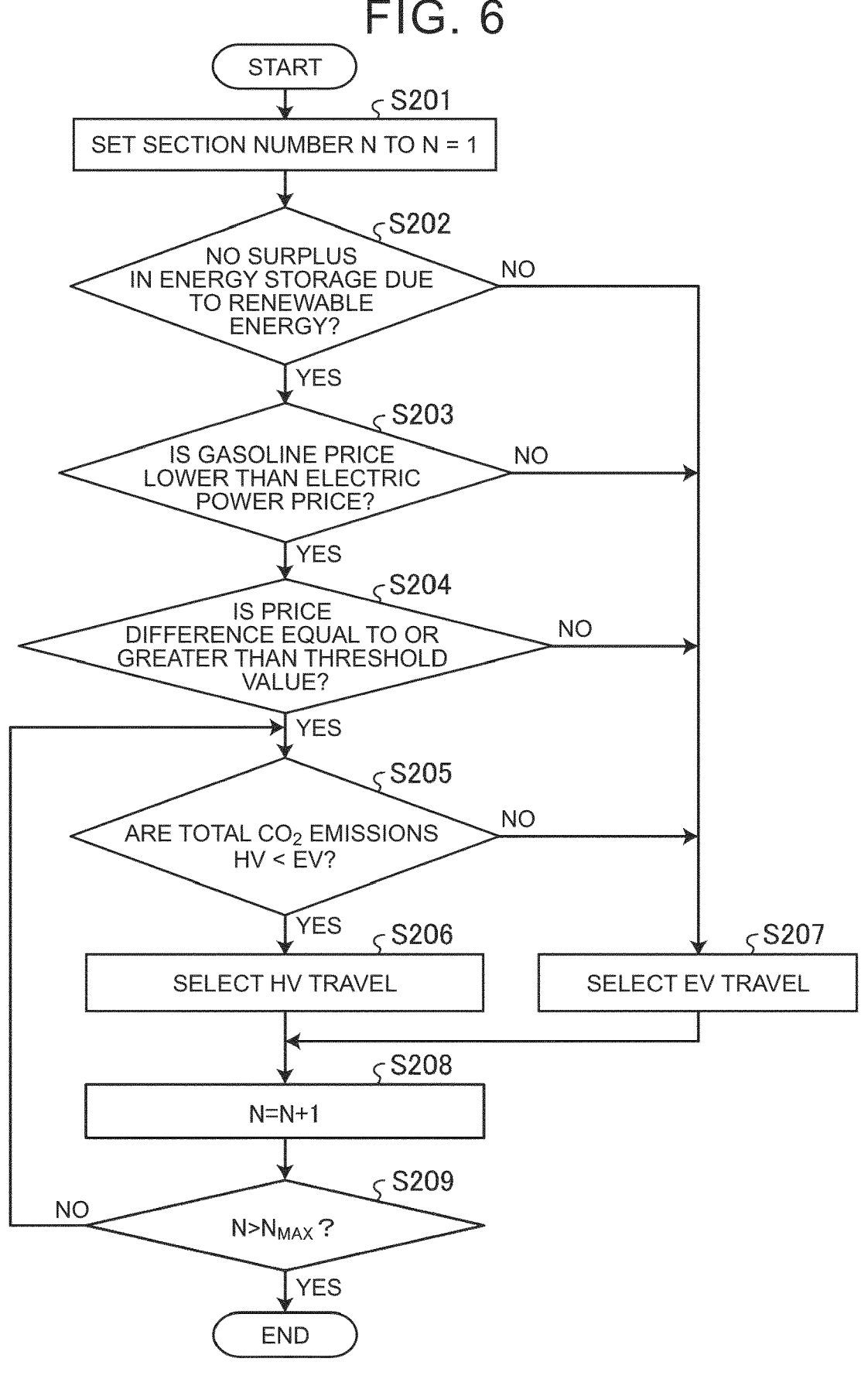
FIG. 6 is a flowchart illustrating a flow of a travel mode setting process according to a modification.

Next, a modification of the present embodiment will be described with reference to FIG. 6. FIG. 6 is a flowchart illustrating a flow of a travel mode setting process according to a modification. Since the configuration of the system is the same as that of the wireless power transfer system 1 according to the embodiment, the description thereof will be omitted.

In the travel control according to Modification 1, first, ECU 88 divides the route of the set destination into a plurality of sections according to the type of the road, for example, the inclination of the road, the presence or absence of the unevenness, and the like, in the same manner as in S101, attaches the section number N (N=1, 2, . . . , $N_{MAX}$), and sets N=1 (S201).

Then, in the same manner as in S102, the determination unit 85 determines whether or not there is an excess in the amount of electricity stored by renewable energy (S202). ECU 88 shifts to S207 when the determination unit 85 determines that there is a surplus in the amount of electricity stored by renewable energy (S202: No). On the other hand, when the determination unit 85 determines that there is no surplus in the amount of electricity stored by the renewable energy (S202: Yes), ECU 88 proceeds to S203.

In S203, the determination unit 85 compares the gasoline price and the electric power price in the same manner as in S103, and determines whether or not the gasoline price is lower than the electric power price. When the determination unit 85 determines that the gasoline price is equal to or higher than the electric power price (S203: No), ECU 88 proceeds to S207. On the other hand, when the determination unit 85 determines that the gasoline price is lower than the electric power price (S203: Yes), ECU 88 proceeds to S204.

In S204, the determination unit 85 determines whether or not the price difference obtained by subtracting the gasoline price from the electric power price is equal to or greater than a preset threshold value. Here, the threshold value is set based on a value obtained by converting the time and effort when the driver supplies gasoline into a price because the driver does not have time and effort to supply power during travel. For this reason, the selection of the driving mode is executed while the gasoline price includes the time and effort of refueling.

When the determination unit 85 determines that the price difference is less than the threshold value (S204: No), ECU 88 proceeds to S207. On the other hand, when the determination unit 85 determines that the price difference is equal to or larger than the threshold value (S204: Yes), ECU 88 proceeds to S205.

In S205, in the same manner as in S104, the determination unit 85 determines whether or not the total $CO_2$ emissions in the case of EV travel are larger than the total $CO_2$ emissions in the case of HV travel by comparing the total $CO_2$ emissions in the case of HV travel with the total $CO_2$ emissions in the case of EV travel in the travel with the set section number N. ECU 88 proceeds to S106 when the determination unit 85 determines that the total $CO_2$ emissions when EV travel is performed is larger than the total $CO_2$ emissions when HV travel is performed (S205: No). ECU 88 proceeds to S105 when the determination unit 85 determines that the total $CO_2$ emissions when EV travel is performed are equal to or less than the total $CO_2$ emission when HV travel is performed (S205: Yes).

In S206, the selection unit 86 selects the travel mode by HV travel as the travel mode of the vehicle 40 with respect to the travel in the section number N. ECU 88 shifts to S208 after the selection of the travel mode by the selection unit 86.

In addition, in S207, the selection unit 86 selects the travel mode by EV travel as the travel mode of the vehicle 40 with respect to the travel in the section number N. In EV travel mode, for example, the vehicle 40 travels EV while being fed with power while the vehicle is traveling by supplying power from the power supply lane 20. ECU 88 shifts to S208 after the selection of the travel mode by the selection unit 86.

In S208, ECU 88 increments the section number N by 1.

Then, ECU 88 determines whether or not the section number N set in S208 is greater than $N_{MAX}$ (S209). When determining that the section number N is greater than $N_{MAX}$ (S209: Yes), ECU 88 ends the travel mode-setting process. On the other hand, when ECU 88 determines that the section number N is equal to or less than $N_{MAX}$ (S209: No), the process proceeds to S205, and the total $CO_2$ emissions due to the running of the updated section number N is determined.

In this way, the total $CO_2$ emissions are minimized based on the gasoline price, the electric power price, and the time and effort of refueling. ECU 88 controls the travel of the vehicles 40 according to the selected travel modes for the respective section numbers.

In the present modification described above, the travel mode in which $CO_2$ emissions are small is selected for each travel section based on the presence or absence of the surplus of the amount of electricity stored by the renewable energy, the comparison between the gasoline price and the electric power price, and the time and effort of the refueling, thereby setting the travel mode considering the environmental aspect and the economic aspect. According to this modification, the driving mode is set on the basis of the total $CO_2$ emissions, taking into account the price-superiority of each section obtained by dividing the route to the destination, so that both the economical driving and the reduction of the environmental load can be achieved.

Further advantages and variations can be readily derived by one of ordinary skill in the art. Thus, the broader aspects of the disclosure are not limited to the specific details and representative embodiments presented and described above. Accordingly, various modifications may be made without departing from the spirit or scope of the general inventive concept as defined by the appended claims and their equivalents.

What is claimed is:

1. A vehicle control device for controlling a vehicle that includes a rotating electrical machine and a gasoline engine and is configured to charge a battery that receives electric power from a power supply lane on a road and that outputs power of the rotating electrical machine, the vehicle control device comprising a processor configured to control travel of the vehicle along a route to a destination by selecting, based on an electric power price, a gasoline price, and total $CO_2$ emissions discharged until the destination, either first travel using the rotating electrical machine and second travel using the gasoline engine, and select the second travel when the gasoline price is lower than the electric power price and $CO_2$ emissions of the second travel is less than $CO_2$ emissions of the first travel.

2. The vehicle control device according to claim 1, wherein the processor is configured to divide the route to the destination into a plurality of sections according to a road type, and set either the first travel or the second travel for each section.

3. The vehicle control device according to claim 1, wherein the processor is configured to select the second travel when the gasoline price is lower than the electric power price and a difference between the gasoline price and the electric power price is equal to or greater than a preset threshold value.

4. A vehicle control device for controlling a vehicle that includes a rotating electrical machine and a gasoline engine and is configured to charge a battery that receives electric power from a power supply lane on a road and that outputs power of the rotating electrical machine, the vehicle control device comprising a processor configured to control travel of the vehicle along a route to a destination by selecting, based on an electric power price, a gasoline price, and total $CO_2$ emissions discharged until the destination, either first travel using the rotating electrical machine and second travel using the gasoline engine, and select the second travel when the gasoline price is lower than the electric power price and a difference between the gasoline price and the electric power price is equal to or greater than a preset threshold value.

5. The vehicle control device according to claim 4, wherein the processor is configured to divide the route to the destination into a plurality of sections according to a road type, and set either the first travel or the second travel for each section.

* * * * *